Figure 1:
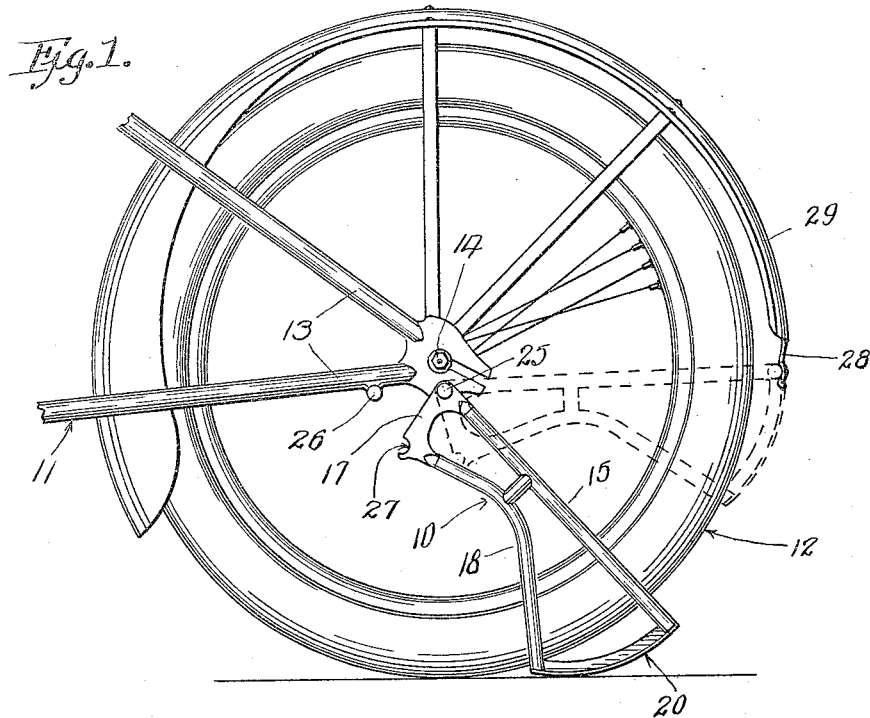

A. ANDERSON.
MOTOR CYCLE STAND.
APPLICATION FILED JAN. 27, 1916.

1,213,994.

Patented Jan. 30, 1917.
2 SHEETS—SHEET 1.

Witnesses:
P. F. Poole.
Clara L. Peoples.

Inventor:
Adolph Anderson.
by Poole & Warne
Attys.

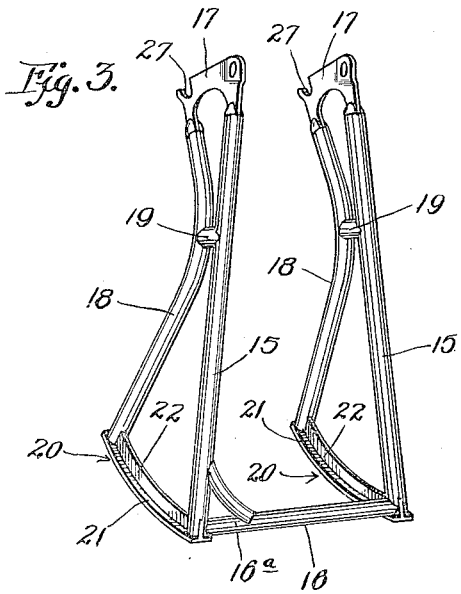
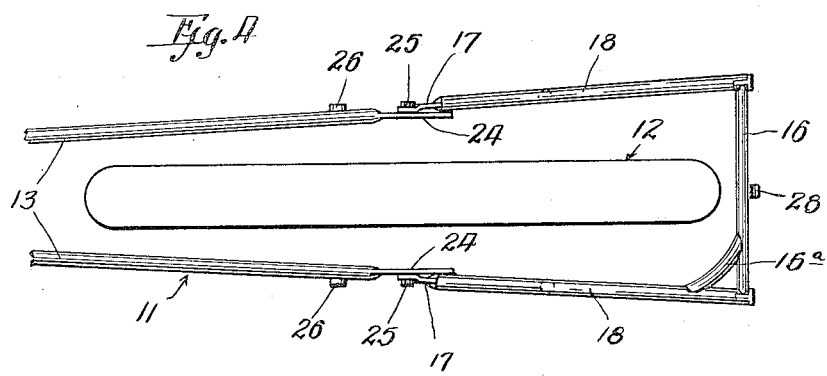

UNITED STATES PATENT OFFICE.

ADOLPH ANDERSON, OF CHICAGO, ILLINOIS, ASSIGNOR TO AURORA AUTOMATIC MACHINERY COMPANY, OF CHICAGO, ILLINOIS, A CORPORATION OF DELAWARE.

MOTOR-CYCLE STAND.

1,213,994. Specification of Letters Patent. Patented Jan. 30, 1917.

Application filed January 27, 1916. Serial No. 74,523.

*To all whom it may concern:*

Be it known that I, ADOLPH ANDERSON, a citizen of the United States, and a resident of Chicago, in the county of Cook and State of Illinois, have invented certain new and useful Improvements in Motor - Cycle Stands; and I do hereby declare that the following is a full, clear, and exact description thereof, reference being had to the accompanying drawings, and to the reference characters marked thereon, which form a part of this specification.

This invention relates to improvements in supporting devices for motor vehicles of the two wheeled type, and more particularly to supporting devices of that kind commonly known as starting stands. Devices of this character are ordinarily applied to motor-cycles or other two wheeled vehicles for the purpose of supporting the vehicle in upright position when not in motion, or for starting the motor thereof preparatory to transmitting power to the driving axle through the medium of suitable clutch mechanism.

A well known form of supporting device or stand comprises a frame pivotally connected to the vehicle, preferably at the rear and adjacent to the rear axle thereof, said frame being held out of contact with the ground when not in use, but capable of being revolved downwardly into contact with the ground, the same being of sufficient length to effect the raising of the rear end of the vehicle from the ground, when said frame is revolved beneath the rear wheel into substantially vertical position.

As ordinarily constructed, these stands consist merely of a U-shaped frame pivoted at its ends on either side of the vehicle frame and embracing the rear wheel. To operate a stand of this character it is necessary to lift the rear end of the vehicle, as well as to move the vehicle rearwardly, in order to revolve the stand beneath the rear wheel and into supporting position. These necessary movements, in addition to simultaneously balancing the vehicle, require considerable muscular exertion, particularly where the vehicle is heavy and the operator is not accustomed or has not the physical strength to properly control the vehicle while manipulating the stand.

The present invention embraces in general the features of the type of stand above described, but, in addition thereto, embodies certain novel features of construction so incorporated in the device as to eliminate the difficulties hereinbefore mentioned and to thereby increase the ease with which the vehicle can be supported in upright position through the medium of the stand.

The novel features of my invention will be fully understood from the description of the form of the device illustrated in the drawings, in which—

Figure 2:
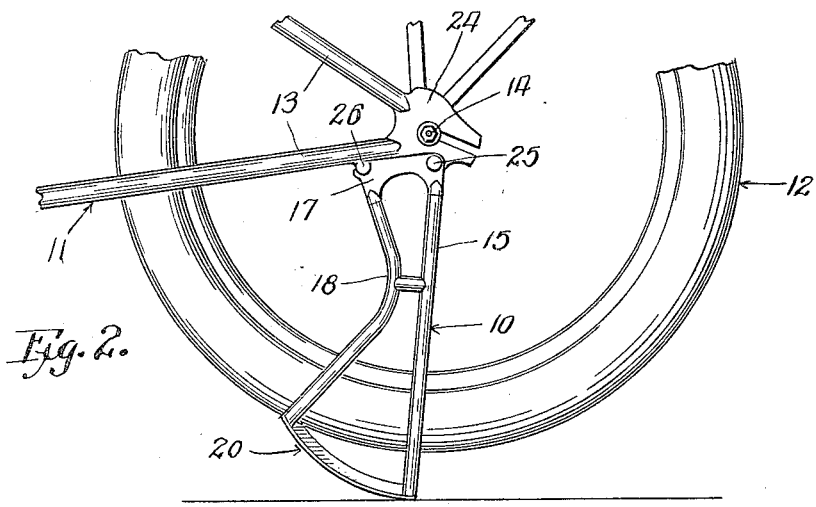

Figure 1 is a view in side elevation of the rear portion of a vehicle, showing the stand in the position preparatory to elevating the vehicle; Fig. 2 is a like view showing the stand in supporting position, with the rear portion of the vehicle elevated; Fig. 3 is a perspective view of the stand removed from the vehicle; and Fig. 4 is a plan view of the rear part of the vehicle, showing the stand in non-operative position.

Referring more in particular to the construction of the starting stand and to its mode of application to a vehicle, the starting stand embodying the features of my invention consists in general of two side frame members 10, 10, pivotally connected to the vehicle frame 11 and embracing the rear wheel 12 of the vehicle, said side frame members being integrally joined together to form a rigid structure. The stand is pivotally attached to the rear fork members 13, 13 of said vehicle frame 11 and at a point immediately below the driving axle 14 of the rear wheel 12, said side frame members extending radially from the points of pivotal connection and inclined outwardly in opposite directions from the vertical plane of the wheel, so that their free ends are spaced a sufficient distance from each other and from the point of contact of the wheel 12 with the ground to afford a greater degree of stability to the vehicle when supported by the stand.

Each side frame member 10, 10 is, for the most part, of a tubular construction, thereby combining maximum strength and minimum weight. The principal or supporting portion of the stand consists of a straight tubular member 15, 15 on each of the side frame members (Fig. 3), joined together at their outer or free ends by means of a transversely extending tubular connecting bar 16 extending between and welded at its ends to said tubular members and acting to integrally connect the same as well as the side frame members together. The members 15, 15 and the bar 16 are preferably provided with an additional strengthening member in the form of a curved brace 16ª connecting the same adjacent to their meeting ends, as shown in Fig. 3. A single brace, as shown is ordinarily used where the vehicle is adapted to have an auxiliary or side car attached to one side thereof, said brace being located on the side of the frame adjacent to the side car, in order to strengthen the frame against lateral stresses due to the presence of the side car. Obviously, however, two braces in corresponding positions may be employed if a more rigid structure is desired.

At the upper extremity of each side frame member 10, 10 is provided an end plate 17 rigidly joined or welded to the straight tubular members 15 and extending in a generally transverse direction from said tubular member in a direction toward the forward end of the vehicle.

In addition to the straight tubular members 15, 15, each side frame member comprises a curved tubular member 18 extending in the same general direction as the straight member and spaced a distance therefrom. The curved member is likewise rigidly connected to the end plate 17 at the opposite end thereof from said straight member 15. The upper portion of the curved member 18 is substantially straight and is inclined slightly in the direction of the straight member 15, there being provided at a point midway of the length of said straight member a short transverse member or brace 19 rigidly joining the straight and curved members 15 and 18. From the point where the brace 19 is located, the member 18 is bent or curved in a direction away from the member 15, the lower portion being substantially straight and inclined to the tubular member 15 at an angle of approximately 45°.

The lower or free end of the curved member terminates at a considerable distance transversely of the member 15 and at a distance short of the free end of said member 15, considered longitudinally. The lower or free ends of the straight and curved tubular members are joined or connected by a curvilinear sector or track member 20, the contour of said member representing the arc of a circle of comparatively small radius with relation to that of the vehicle wheel and which is eccentric to the arc of swinging movement of the stand. Stated more exactly, the center of the radius of curvature of said track member is preferably located approximately upon the center line of the straight member 15 and at a point midway of its length.

The sector or track member 20 is of the inverted T form, thereby providing a flat curvilinear bearing flange 21 having bearing upon the surface of the ground, and a strengthening flange or rib 22. The ends of the curved and straight members 18 and 15 are preferably slotted to receive the upright flange 21 of the track member, and the interfitted ends welded together to form a rigid joint.

As before stated, the side frame members are pivotally connected to the rear fork member of the vehicle frame. To accomplish this end there is mounted, in suitable manner upon the plates 24, 24, located at the junction of the rear fork members 13 and on both sides of the vehicle frame, oppositely disposed studs 25, 25, located immediately below the axle 14 of the rear wheel (Figs. 1, 2, and 4). To these studs are pivotally connected the side frame members 10, 10 of the stand, there being provided in the end plates 17, 17 thereof apertures located substantially in longitudinal alinement with the straight tubular members 15, 15 of said side frame members. Located forwardly of the pivot studs 25, 25 are further provided other studs or lugs 26, 26 rigidly mounted upon the frame members of the vehicle frame and on opposite sides thereof. These studs 26, 26 are located in the path of swinging movement of the stand and are adapted to engage notches 27, 27 formed in the upper margin of the end plates 17, 17 of the side frame members and substantially in alinement with the upper portion of the curved tubular members 18, 18.

To operate the stand, the same is first revolved downwardly into the position shown in Fig. 1, namely, with the forward ends of the sectors or track members 20, 20 in contact with the ground immediately to the rear of the point of contact of the rear wheel with the ground. In this position the transverse bar 16 and the adjacent ends of the track members are elevated above the ground. To raise the vehicle with the stand in the position shown in Fig. 1, it is only necessary for the operator to place a foot upon the transverse bar and bear the full weight of his body downwardly upon the same, at the same time grasping the vehicle and exerting a slight force or pull in a rearward direction. The pressure or weight exerted upon the bar or elevated end of the track members serves to roll the stand from front to rear along the curved surface of said track members, which imparts a rearward movement to the vehicle and at the same time elevates the rear of the vehicle, by reason of the eccentric relation of the curvature of said track members to the path of movement of the stand, when the same is swung to a position beneath said rear portion of the vehicle. The rotative movement of the stand is arrested by the contact of the end plates 17, 17 with the studs 26, 26 at the notches 27, 27 of said plates, said stand coming to rest in the position shown in Fig. 2, wherein the vehicle is completely supported by the stand. In supporting position the straight tubular member is substantially vertical, although preferably inclined forwardly a small degree in order that the weight of the vehicle shall be suspended rearwardly of the point of contact of the stand with the ground. In supporting position the stand serves to maintain the vehicle in upright position either at a rest during the time the vehicle is not in use or for the purpose of starting the motor prior to lowering the rear wheel to the ground and throwing in the clutch to propel the vehicle. It is manifest that a forward push upon the vehicle is only necessary to allow the stand to roll in a direction to effect the gradual lowering of the rear wheel into contact with the ground. When not in use the stand can be swung upwardly and rearwardly to substantially horizontal position, wherein it is engaged by the usual form of spring clip 28 secured to the extremity of the fender 29 and in position to engage the transverse bar 16 of said stand, as shown in Fig. 4 and in dotted lines in Fig. 1.

It is obvious that the stand embodying the so-called rolling feature makes it possible to elevate the vehicle with but comparatively little muscular effort, a feature of vital importance at the present time owing to the increasing demand for motorcycles of greater power, hence involving the use of larger motors, stronger frames, and more complex mechanisms in the manufacture of the motorcycle, all of which necessarily increases the weight of the vehicle to a large degree.

The features of construction of the device herein described and illustrated may be variously modified without departing from the spirit of the invention, and for that reason I do not wish to be limited as to the scope of the disclosure except in so far as specifically pointed out in the appended claims.

I claim as my invention:

1. A supporting stand for vehicles, comprising connected together side frame members, each frame member consisting of longitudinal members spaced apart at their ends and joined together intermediate their ends by a transverse brace member, an end plate joining the inner ends of said longitudinal members and adapted to have pivotal connection with the vehicle frame, and a curvilinear track member connecting the outer ends of said longitudinal members, and arranged in eccentric relation to the point of pivotal connection of the stand and vehicle frame.

2. A supporting stand, comprising connected together side frame members adapted to be pivotally mounted on a vehicle frame, each consisting of longitudinal members spaced apart at their ends, a curvilinear track member connecting the outer ends of said longitudinal members and disposed in eccentric relation to the point of pivotal connection of the stand and vehicle frame, and a transverse member connecting the inner ends of said longitudinal members and adapted to engage the vehicle frame to retain said stand in supporting position.

3. A supporting stand for vehicles, comprising connected together side frame members, each comprising longitudinally extending members spaced apart at their ends and joined together at their central portions by a short transverse brace member, an end plate connecting the inner ends of said longitudinal members and adapted to have pivotal connection with the vehicle frame, a curvilinear track member connecting the outer ends of said longitudinal members and arranged in eccentric relation to the pivotal point of the stand and adapted to roll in contact with the ground to elevate the vehicle, and a stop member on said vehicle frame adapted to engage said end plate to retain said stand in supporting position.

4. A supporting stand for vehicles, comprising side frame members, each embracing longitudinally extending tubular members, one of said tubular members being straight, the other being substantially curvilinear and having its ends spaced from the ends of said straight tubular member, a short bracing member connecting the central portions of said tubular members, a transverse bar connecting the outer ends of said straight longitudinal members, an end plate connecting the inner ends of said longitudinal members and adapted to be pivotally connected to the vehicle frame, a curvilinear track member extending between the outer ends of said tubular members and arranged in eccentric relation to the pivotal point of the stand and adapted to roll in contact with the ground to elevate the vehicle, and coacting stop members on the vehicle frame and said end plate adapted to retain said stand in supporting position with said straight tubular members substantially vertical.

In testimony that I claim the foregoing as my invention, I affix my signature this January 22nd, A. D. 1916.

ADOLPH ANDERSON.